US006942552B2

(12) United States Patent
Lalli et al.

(10) Patent No.: US 6,942,552 B2
(45) Date of Patent: *Sep. 13, 2005

(54) DISC REPAIR SYSTEM

(76) Inventors: Edward A. Lalli, 7546 N. 50th Ave., Glendale, AZ (US) 85301; William M. Doherty, 6713 N. 26th Ave., Phoenix, AZ (US) 85017; John L. Doherty, Jr., 8705 N. 58th La., Glendale, AZ (US) 85302

( * ) Notice: Subject to any disclaimer, the term of this patent is extended or adjusted under 35 U.S.C. 154(b) by 1 day.

This patent is subject to a terminal disclaimer.

(21) Appl. No.: 10/666,890

(22) Filed: Sep. 18, 2003

(65) Prior Publication Data

US 2004/0063388 A1 Apr. 1, 2004

Related U.S. Application Data

(62) Division of application No. 09/766,802, filed on Jan. 22, 2001, now Pat. No. 6,638,149.

(51) Int. Cl.[7] .................................................. B24B 1/00
(52) U.S. Cl. ......................................... 451/63; 451/37
(58) Field of Search ............................. 451/57, 59, 63, 451/28, 37, 41

(56) References Cited

U.S. PATENT DOCUMENTS

| | | | | | |
|---|---|---|---|---|---|
| 5,099,618 | A | * | 3/1992 | Schmid | 451/57 |
| 5,571,041 | A | * | 11/1996 | Leikam | 451/37 |
| 5,964,650 | A | * | 10/1999 | Born et al. | 451/63 |
| 6,043,961 | A | * | 3/2000 | Yamamoto et al. | 360/131 |
| 6,180,245 | B1 | * | 1/2001 | Janssen et al. | 428/426 |
| 6,312,320 | B2 | * | 11/2001 | Sato et al. | 451/285 |
| 6,322,430 | B1 | * | 11/2001 | Kennedy et al. | 451/287 |
| 6,595,835 | B2 | * | 7/2003 | Gadbois | 451/66 |
| 6,638,149 | B2 | * | 10/2003 | Lalli et al. | 451/63 |

* cited by examiner

*Primary Examiner*—Dung Van Nguyen
(74) *Attorney, Agent, or Firm*—Stoneman Law Offices, Ltd.; Martin L. Stoneman; Benjamin K. Erlick

(57) ABSTRACT

A disc repair system which is provided for the purpose of consumer-repairing of scratches on optically-read discs (e.g., digitally recorded discs, known commonly, as "CD" discs or "DVD" discs, etc., containing audio or video or other formats of data information), such that an optical reader, which uses a laser to read digital information stored on a compact disc, can read the digital information without the optical distortion caused by a scratch. The system utilizes diamond grit as an abrading compound to recondition the disc surface.

12 Claims, 4 Drawing Sheets

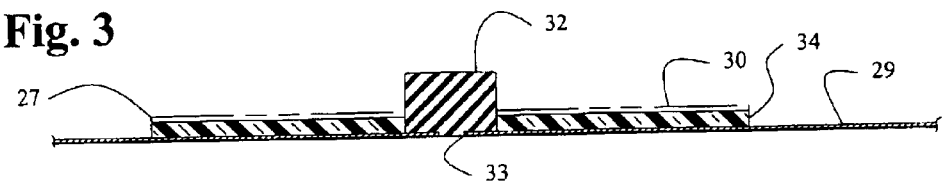
Fig. 3
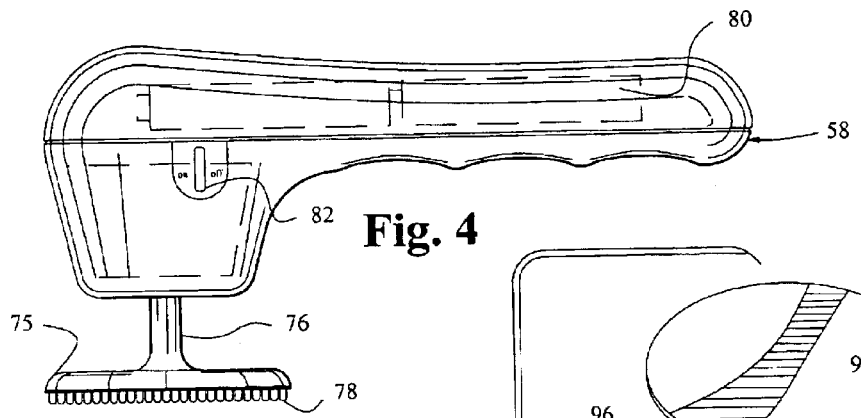
Fig. 4
Fig. 5
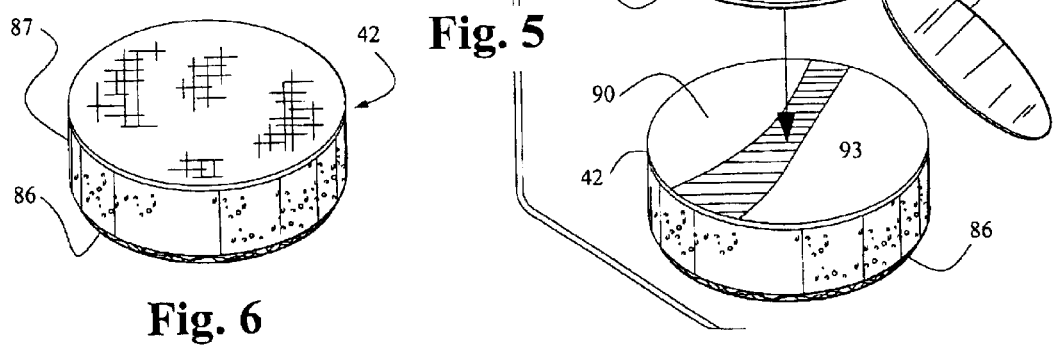
Fig. 6
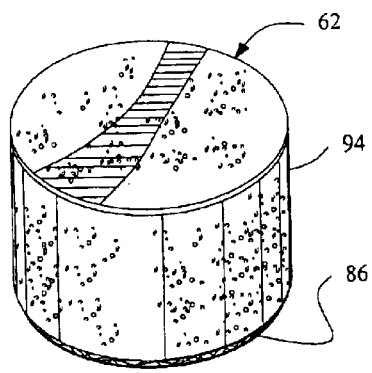
Fig. 7
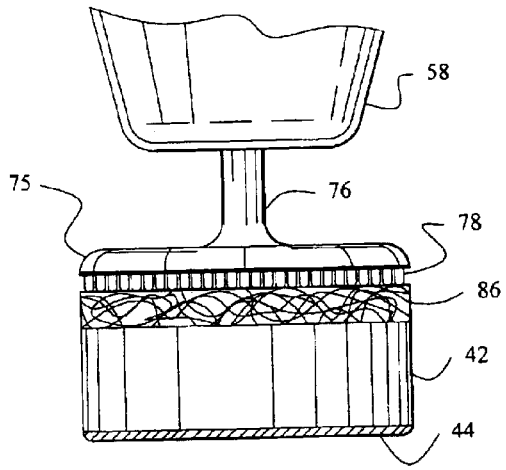
Fig. 8

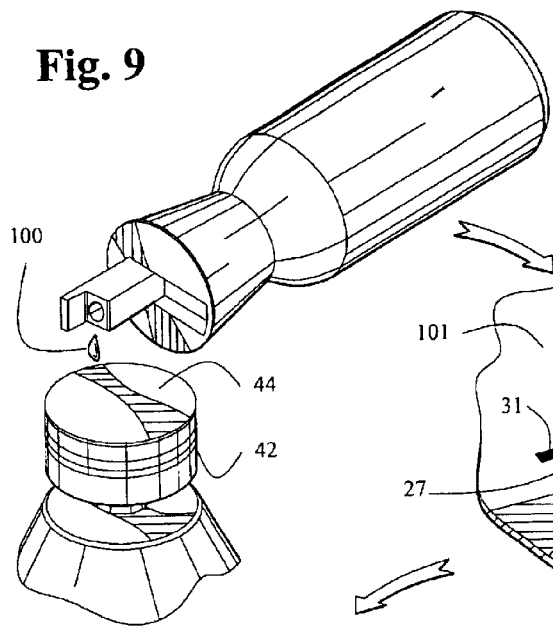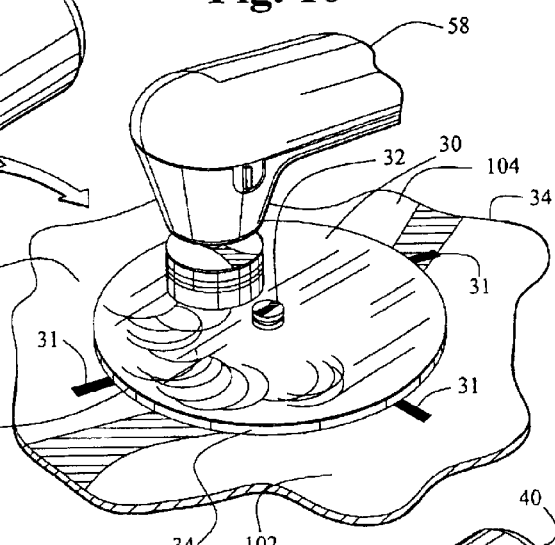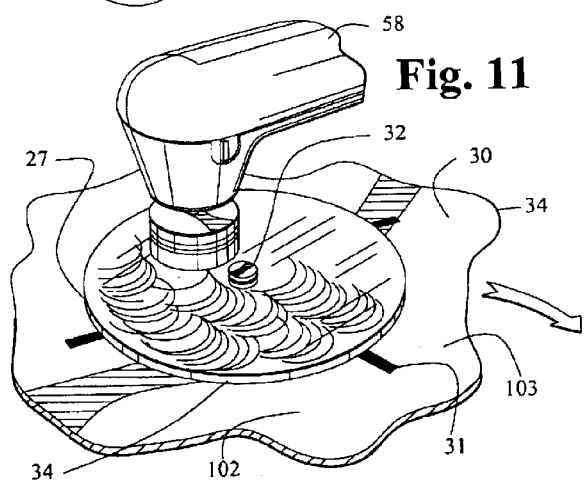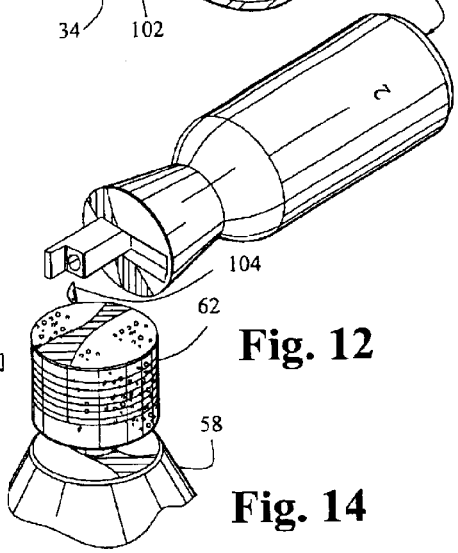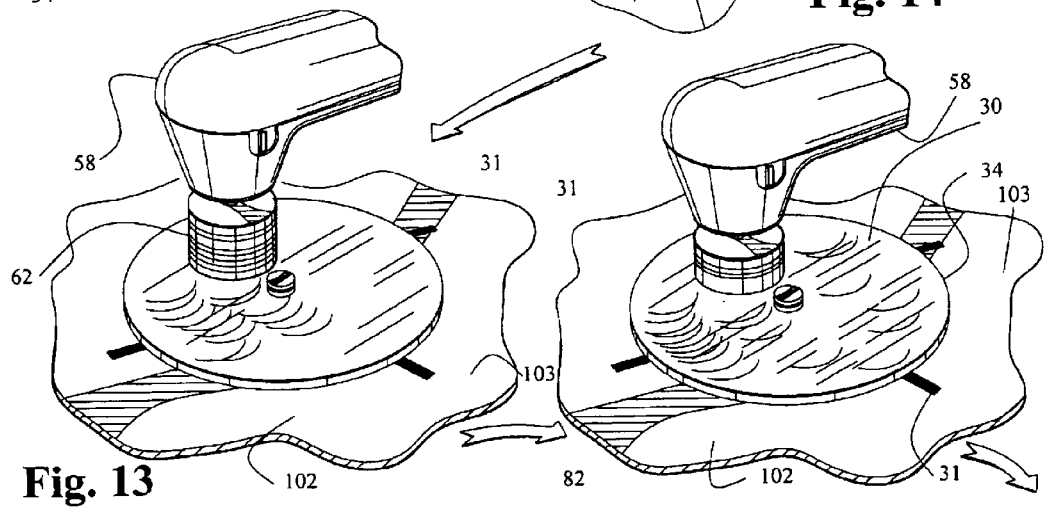

US 6,942,552 B2

DISC REPAIR SYSTEM

CROSS-REFERENCE TO RELATED APPLICATIONS

The present application is a divisional application of application Ser. No. 09/766,802, filed Jan. 22, 2001, now U.S. Pat. No. 6,638,149, entitled "Disc Repair System" which is not admitted to be prior art with respect to the present invention by mention in this cross-reference section.

BACKGROUND

This invention relates to a system for repairing scratches on optically-read discs, such as, for example, compact discs, digital video discs, etc. (often called "CD's" and "DVDs" respectively). More specifically, this invention provides a more efficient system for refurbishing the compact disc surface such that an optical reader, which, for example, may use a laser to read digital information stored on a compact disc, can read the digital information without the optical distortion caused by a scratch.

Typically, digitally recorded discs, known commonly as "CD" discs or "DVD" discs, contain audio or video information. The digital information is currently interpolated or read by an optical reader that uses one or more laser beams or other light amplified beams to read the digital information. The current state of the art of manufacture of these CD discs is such that they are comprised of a round disc composed of a synthetic material (e.g., plastic), with a typical diameter of approximately 4¾ inches and an approximate thickness of 1/16 inches. The disc has a center aperture typically approximately ⅝ inches in diameter for receiving a centering spindle in a playback apparatus. Digitally recorded material typically extends on one side of the disc, from about ¾ inches from the center aperture outward to within about ¼ inch of the peripheral end of the disc. A bearing area typically extends on the other side, in approximately the same dimensions, for bearing on a playback apparatus which spins the disc at high speed. The digital information is contained on a relatively thin layer of metallic material covered by a protective layer of the synthetic material, usually a plastic. A laser within the playback apparatus reads the digital information through the plastic layer. Recently (for example), optically-read discs include multi-layer laminated discs; and it is pointed out that describing discs generally herein is not intended to limit the technology of optically-read discs which is addressed herein. If the plastic layer becomes scratched or stained, the laser light will distort and not accurately read the digital information.

In the past, repair systems using diatomaceous earth and/or alumina oxides and/or silica oxides as abrasives have been contemplated for removing scratches from compact discs. However, these abrasives quickly degrade and lose effectiveness. Further abrasives such as diatomaceous earth, alumina oxides, and silica oxides do not provide a highly uniform particle size, which is desirable in abrading optical discs to remove scratches.

OBJECTS AND FEATURES OF THE INVENTION

A primary object and feature of the present invention is to fulfill the above-mentioned need by the provision of a disc repair system which repairs scratches in optically read discs so that the digital information may be read by an optical reader. In addition, it is a primary object and feature of this invention to provide such a system which utilizes diamond grit as an abrasive, to provide consistent abrasive particle size for more effective scratch removal.

A further primary object and feature of the present invention is to provide such a system that is efficient, inexpensive, and handy. Other objects and features of this invention will become apparent with reference to the following descriptions.

SUMMARY OF THE INVENTION

According to a preferred embodiment of the present invention, this invention provides a consumer kit for reconditioning a scratched operating surface of an optically-read disc, comprising, in combination: a holding means for holding the disc in a substantially stationary position with the operating surface exposed and facing upwardly; an abrader means for abrading the operating surface; a hand-held power tool means for powered rubbing of such abrader means on the operating surface; and a cleaning means for cleaning the operating surface. It also provides such a system further comprising a container means for containing such consumer kit within a box having a lid. Further, it provides such a system wherein such lid comprises such holding means. Also, it provides such a system wherein such box comprises spacer means for orderly arranging of elements of such consumer kit, and it provides such a system wherein such abrader means comprises a series of abrasives for abrading the operating surface in a user-controlled manner.

Moreover, it provides such a system wherein such hand-held power tool means comprises a powered rotary spindle; and such a system further comprises a set of polishing means removably attachable to such rotary spindle for polishing the operating surface. Still further, it provides such a system wherein abrader means further comprises such set of polishing means.

According to another preferred embodiment of the present invention, this invention provides a consumer kit for reconditioning a scratched operating surface of an optically-read disc, comprising, in combination: an optically-read-disc holder structured and arranged to hold the optically-read disc in a substantially stationary position with the operating surface exposed and facing upwardly; a set of abrasive products structured and arranged to abrade the operating surface in an ordered manner when rotatably rubbed on the operating surface; a hand-held rotary power tool having a powered rotary spindle structured and arranged to removably hold one such spindle-rotatable abrasive product; and a set of wipes each structured and arranged to clean the operating surface.

Additionally, it provides such a system further comprising a box having a lid, structured and arranged to contain such consumer kit; and such a system wherein such lid comprises such optically-read-disc holder; and further, wherein such box comprises a spacer structured and arranged to assist orderly arranging of elements of such consumer kit. It also provides such a system wherein such set of abrasive products comprises: a set of polishing pads each structured and arranged to be removably attached to such rotary spindle; and a polishing compound. And, it provides such a system wherein such set of abrasive products further comprises: a buffing pad structured and arranged to be removably attached to such rotary spindle; and a buffing compound.

Even further, it provides such a system wherein such set of abrasive products further comprises: a 15 grit micron abrading disc; a 9 grit micron abrading disc; a 3 grit micron abrading disc; a polishing compound less than 9 grit; and a cleaning disc having a lesser grit than the polishing compound. Still further, it provides such a system wherein such set of abrasive products further comprises a series of diamond grit abrasives ranging from about 60 micron diamond grit to about 6 micron diamond grit.

According to yet another preferred embodiment of the present invention, this invention provides a method for using consumer-kit elements to recondition a scratched operating surface of an optically-read disc, comprising, in combination, the steps of: placing the optically-read disc in a stationary position on a portable holder provided by the consumer kit, with the scratched operating surface facing upwardly; providing, by such consumer kit, a set of abrasion products structured and arranged to remove material from such scratched operating surface when rubbed on such scratched operating surface; using a hand-held rotating power tool, having a rotary spindle, provided by such consumer kit, rubbing in a polishing order a selection of such abrasion products on such scratched operating surface; and using cleaning elements provided by such consumer kit, cleaning such scratched operating surface. It also provides such a system wherein such set of abrasive products comprises a set of polishing pads each structured and arranged to be removably attached to such rotary spindle; and a polishing compound.

Even further, it provides such a system wherein such set of abrasive products further comprises: a buffing pad structured and arranged to be removably attached to such rotary spindle; and a buffing compound. Also, it provides such a system wherein such set of abrasive products further comprises: a 15 grit micron abrading disc; a 9 grit micron abrading disc; a 3 grit micron abrading disc; a polishing compound less than 9 grit; and a cleaning disc having a lesser grit than the polishing compound. And, it provides such a system wherein such set of abrasive products further comprises a series of diamond grit abrasives ranging from about 60 micron diamond grit to about 6 micron diamond grit. In accordance with a preferred embodiment hereof, this invention provides a consumer kit for reconditioning a scratched operating surface of at least one optically-read disc, comprising, in combination: at least one optically-read-disc holder adapted to hold the at least one optically-read disc in a substantially stationary position with the optically-read surface exposed and facing upwardly; at least one abrasive product adapted to abrade the operating surface when rotatably rubbed on the operating surface; and at least one hand-held rotary power tool comprising a powered rotary spindle structured and arranged to removably hold the at least one abrasive product; and wherein such at least one abrasive product comprises diamond grit abrasive. Moreover, it provides such a consumer kit wherein such at least one abrasive product comprises diamond grit abrasive ranging from about 60 micron diamond grit to about 6 micron diamond grit.

In accordance with another preferred embodiment hereof, this invention provides a system for reconditioning at least one scratched operating surface of at least one optically-read disc, comprising, in combination: at least one holding means for holding the at least one optically-read disc; at least one abrasive means for abrading the at least one scratched operating surface of the at least one optically-read disc; wherein such at least one abrasive means comprises at least one diamond abrasive of at least one grit size.

In accordance with another preferred embodiment hereof, this invention provides a system for reconditioning at least one scratched operating surface of at least one optically-read disc, comprising, in combination: at least one holder structured and arranged to hold the at least one optically-read disc; at least one abrader structured and arranged to abrade the at least one scratched operating surface of the at least one optically-read disc; wherein such at least one abrader comprises at least one diamond abrasive of at least one grit size.

In accordance with another preferred embodiment hereof, this invention provides a system for reconditioning at least one scratched operating surface of at least one optically-read disc, comprising in combination: an optically-read-disc holder structured and arranged to hold the at least one optically-read disc in a desired position; a set of diamond abrasive products structured and arranged to abrade the at least one scratched operating surface when rubbed on the at least one scratched operating surface. Additionally, it provides such a system, wherein such set of diamond abrasive products comprises abrasive particles at least 6 microns in size. Also, it provides such a system, wherein such set of diamond abrasive products comprises a progressively finer abrasive particle series in a range between about 60 microns to about 6 microns. In addition, it provides such a system, wherein such set of diamond abrasive products further comprises: 60 micron diamond grit; 30 micron diamond grit; 15 micron diamond grit; and 6 micron diamond grit.

In accordance with another preferred embodiment hereof, this invention provides a method for reconditioning at least one scratched operating surface of at least one optically-read disc, comprising, in combination, the steps of: placing the at least one optically-read disc on the at least one holding means, with the scratched operating surface exposed; providing a set of diamond abrasive products structured and arranged to remove material from such scratched operating surface when rubbed on such scratched operating surface. And, it provides such a method, wherein such set of diamond abrasive products comprises abrasive particles at least 6 microns in size. Further, it provides such a system, wherein such set of diamond abrasive products comprises a progressively finer abrasive particle series in a range between about 60 microns to about 6 microns. Even further, it provides such a system, wherein such set of diamond abrasive products further comprises: 60 micron diamond grit; 30 micron diamond grit; 15 micron diamond grit; and 6 micron diamond grit.

BRIEF DESCRIPTION OF THE DRAWINGS

FIG. 3 is a cross-section view through the compact disc and holder of section 3—3 of FIG. 2 of the disc repair system kit.

FIG. 4 is a perspective view of the hand-held disc rotator.

FIG. 5 is a perspective view illustrating the application of another embodiment of the polishing pad to a polishing disc.

FIG. 6 is a perspective view of a polishing pad removably attached to a polishing disc.

FIG. 7 is a perspective view of a buffing pad.

FIG. 8 is a perspective view of a polishing pad and polishing disc shown attached to a disc rotator.

FIG. 9 is a perspective view illustrating application of a polishing compound to the polishing disc.

FIG. 10 is a perspective view illustrating the application of the polishing disc upon the compact disc.

FIG. 11 is a perspective view further illustrating the application of the polishing disc upon the compact disc.

FIG. 12 is a perspective view illustrating application of a buffing compound to the buffing pad.

FIG. 13 is a perspective view illustrating the application of the buffing pad upon the compact disc.

FIG. 14 is a perspective view further illustrating the application of the buffing pad upon the compact disc.

DETAILED DESCRIPTION OF THE BEST MODE AND PREFERRED EMBODIMENTS OF THE INVENTION

Figure 1:
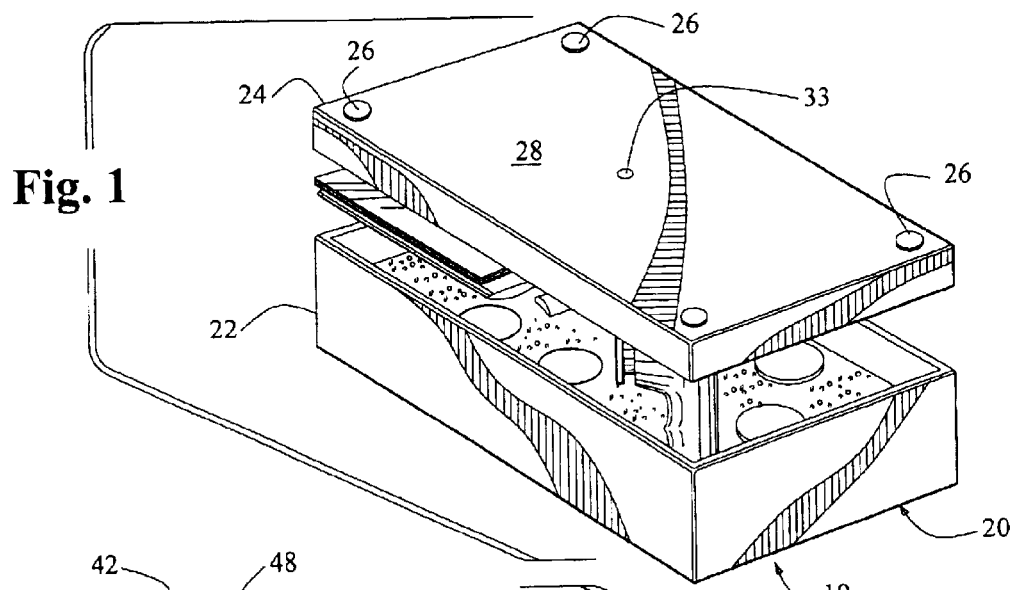
FIG. 1 is a perspective view of the container of a preferred embodiment of the disc repair system kit.

Illustrated in FIG. 1 is an overall view of the container 20 of a preferred embodiment of the disc repair system kit 10. The container 20 is preferably comprised of a body 22 and a cover 24. Preferably, body 22 (embodying herein a container means for containing such consumer kit within a box having a lid; and a box, having a lid, structured and arranged to contain such consumer kit) is best embodied by a rectangular box approximately sized at 6 inches wide X 10½ inches long X 2½ inches high. The body 22 and cover 24 are preferably metal. Upon reading the teachings of this specification, those with ordinary skill in the art will now understand that, under appropriate circumstances, considering issues such as manufacturing cost, market demand, etc., other materials, shapes and size arrangements may suffice, such as, for example, using plastic and/or another material instead or in addition to metal, smaller or larger dimensions, different shapes such as a round box, oval box, etc. Preferably, body 22 has a cover 24 which is made such that it fits snugly over the body 22. Preferably, cover 24 has a rubber anti-slip disc 26 on or near each of the corners of the top 28. The purpose of these discs is to assist in keeping cover 24 from slipping when it is turned on its top 28, and the inside portion 29 (shown further in FIG. 2) is used to hold a disc 30 (i.e., a compact disc or CD, a digital video disc or DVD, or yet some other optically-read disc which is manufactured in a similar manner).

Figure 2:
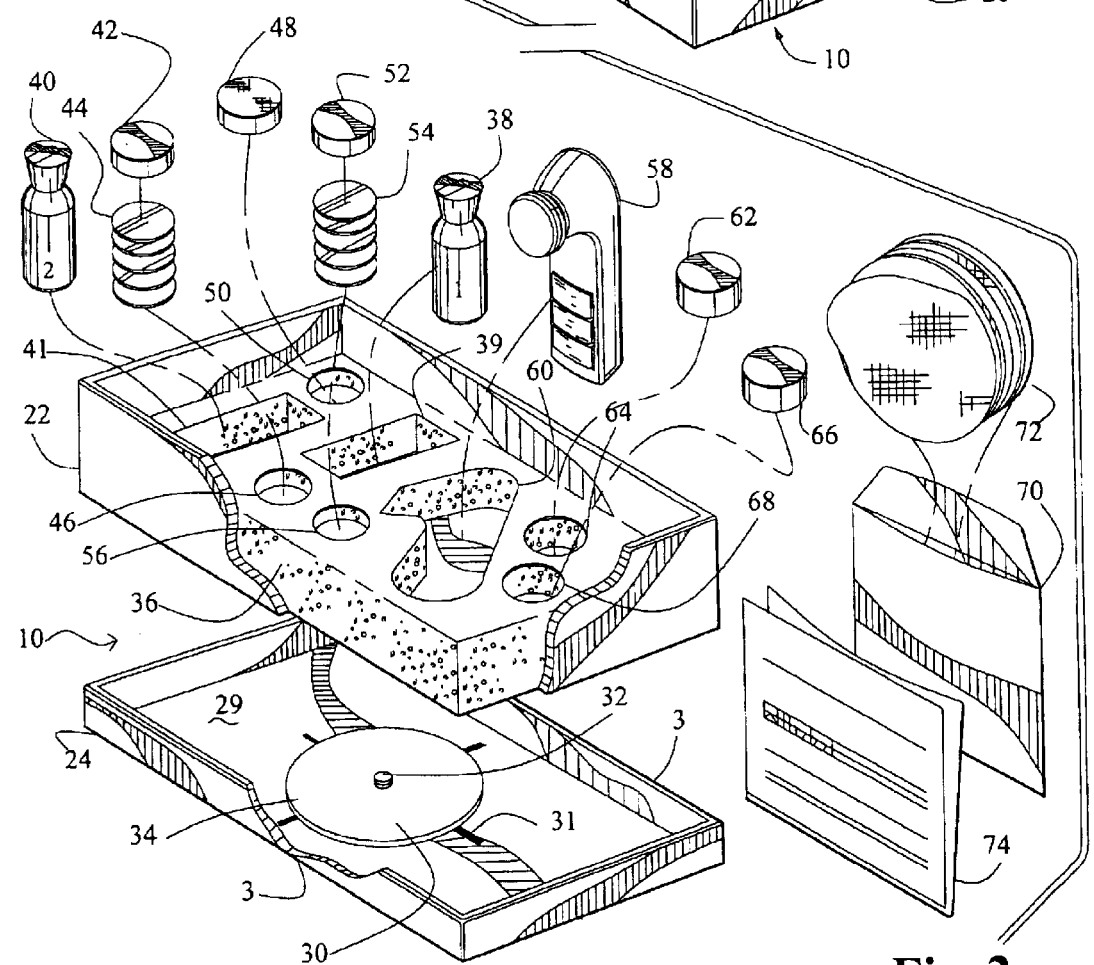
FIG. 2 is a perspective view of the internal parts of the disc repair system kit.

FIG. 2 is a perspective view of a preferred embodiment of the parts of the disc repair system kit 10. Referring first to cover 24, cover 24 is illustrated with the inside portion 29 in the up position and the top 28 preferably resting on a flat surface (not shown). Located in the center of the top 24 is a rubber disc holder 34 (e.g., a custom cut piece of open-cell rubber approximately ⅛ inch thick, Model No. O-C SBR SNG #3120, available from Rubberite Corp., 301 East Goetz Ave, Santa Ana, Calif. 92707, placed on a custom cut piece of ⅛ inch steel plate). Preferably, rubber disc holder 34 is about 4¾ inches in diameter. Preferably, rubber disc holder 34 is sized such that it is the same size as a standard compact disc. The compact disc is preferably set on the rubber disc holder 34 with the operating surface exposed and facing upwardly (this arrangement embodying herein a holding means for holding the disc in a substantially stationary position with the operating surface exposed and facing upwardly; and an optically-read-disc holder structured and arranged to hold the optically-read disc in a substantially stationary position with the operating surface exposed and facing upwardly). Preferably, in the center of rubber disc holder 34 is a round spindle 32 approximately 9/16 of an inch in diameter. The spindle 32 has a smaller portion 33 (see FIG. 1) which is inserted into the cover 24. The smaller portion 33 is preferably about ¼ inch in diameter and is adhesively inserted in a same sized ¼ inch hole in the center of cover 24 (see FIG. 1). Both the spindle 32 and rubber disc holder 34 are preferably permanently adhered to the cover 24 (this arrangement embodying herein wherein such lid comprises such optically-read-disc holder; and wherein such lid comprises such holding means). The preferred adhesive is double-sided adhesive tape; however, there may be other suitable adhesives that would suffice (e.g., clear acrylic adhesive). Preferably, box body 22 contains a foam insert 36 (e.g., a closed cell rigid foam, such as that available from Foamex, 4011 West Clarendon, Phoenix, Ariz. 85019) which is structured and arranged to removably hold the components (later described herein) of the disc repair system kit 10 (this arrangement embodying herein wherein such box comprises spacer means for orderly arranging of elements of such consumer kit; and wherein such box comprises a spacer structured and arranged to assist orderly arranging of elements of such consumer kit). Upon reading the teachings of this specification, those with ordinary skill in the art will now understand that, under appropriate circumstances, considering issues such as manufacturing cost, market demand, etc., other arrangements may suffice, such as, for example, holding insert may be made from a variety of other materials (e.g. non-foamed plastic), or formed in other ways, etc.

The additional components of the disc repair system kit 10 are now described herein. A container 38 of polishing compound (e.g., blend #19-polish A from Unichem Corp., 110 E Main Ave., Casa Grande, Ariz. 85230) preferably fits into space 39. Upon reading the teachings of this specification, those with ordinary skill in the art will now understand that, under appropriate circumstances, considering issues such as manufacturing cost, intended use, optical disc material, etc., other polishing compound arrangements may suffice, such as, for example, alternate polishing compounds, etc. A container 40 of buffing compound (e.g., buffing compound #1 from Springer Ind., 930 W. Birchwood, Mesa, Ariz.) preferably fits into space 41. Upon reading the teachings of this specification, those with ordinary skill in the art will now understand that, under appropriate circumstances, considering issues such as manufacturing cost, intended use, optical disc material, etc., other buffing compound arrangements may suffice, such as, for example, alternate buffing compounds, etc. A polishing pad 42 (e.g., medium density closed cell foam, such as that available from Foamex, 4011 West Clarendon, Phoenix, Ariz. 85019) and polishing discs 44 (e.g., 15 grit micron wet/dry aluminum oxide abrasive paper from 3M corporation, and, preferably also including 9 grit micron and 3 grit micron such paper discs, as mentioned herein, with appropriate spaces) preferably fit into space 46. A foam pad with a linen backer (included as an example used for diamond abrasives; otherwise, an extra polishing pad 42 is inserted here) preferably fits into space 50. A polishing pad 52 and polishing discs 54 (e.g., 9 micron wet/dry aluminum oxide abrasive paper from 3M corporation) preferably fit into space 56. (The above polishing pads, discs and polishing compounds embody herein wherein abrader means further comprises such set of polishing means; and an abrader means for abrading the operating surface; and also a set of abrasion products structured and arranged to remove material from such scratched operating surface when rubbed on such scratched operating surface; and further embody herein wherein such abrader means comprises a series of abrasives for abrading the operating surface in a user-controlled manner; and even further embody herein a set of abrasive products structured and arranged to abrade the operating surface in an ordered manner when rotatably rubbed on the operating surface). A hand-held disc rotator 58, preferably with an adjustable RPM of 600–1200, preferably fits into space 60. Those with ordinary skill in the art of small electrically-operated disc rotators will, without undue experimentation, be able to design and build such a rotator having proper torque and other characteristics for disc polishing. A buffing pad 62 (e.g., medium density closed cell foam, such as that available from Foamex, 4011 West Clarendon, Phoenix, Ariz. 85019, with attached 40 pound fabric linen available from a fabric store, such as H&R sales, 1118 N 35$^{th}$ Avenue, Phoenix, Ariz. 85009) preferably fits into space 64. A buffing pad 66 (same material as buffing pad 62) preferably fits into space 68. A package 70 of disc wiping cloths 72 (e.g., hydro-entangled 1.6 oz polyester/rayon blend fabric) is included. This arrangement embodies herein a set of wipes each structured and arranged to clean the operating surface. A set of instructions 74 is also included. These above-described items will be further herein explained below.

Illustrated in FIG. 3 is a diagrammatic cross-sectional view (relative dimensions may be inaccurate) through the CD disc 30 and rubber disc holder 34 of section 3—3 of FIG. 2 of the disc repair system kit 10. Rubber disc holder 34 is shown adhesively mounted to the inside portion 29 of cover 24. Spindle 32 is shown preferably mounted in the center of the rubber disc holder 34 and is approximately 9/16 inch in diameter. The spindle 32 has a smaller portion 33, which is preferably about ¼ inches in diameter, and is permanently adhesively inserted in a same-nominal-sized ¼ inch hole in the center of cover 24.

FIG. 4 illustrates a perspective view of the hand-held disc rotator 58. The disc rotator 58 is preferably a battery-operated (and, in appropriate circumstances, other AC and DC power sources, as engineered by those with ordinary skill in this art) hand-held device (embodying herein wherein such hand-held power tool means comprises a powered rotary spindle). Illustrated is one (preferred) example. The illustrated unit has 4 AA batteries 80 for power, and an on/off switch 82. The device uses an electric motor to turn a spindle 76, upon which a flat round disc 75 is connected (embodying herein wherein such hand-held power tool means comprises a powered rotary spindle: and a hand-held power tool means for powered rubbing of such abrader means on the operating surface; and a hand-held rotary power tool having a powered rotary spindle structured and arranged to removably hold one such spindle-rotatable abrasive product). These general types of devices are well-known in the art and will not be further described. The preferred revolutions per minute (RPM's) are between 600 RPM and 1200 RPM. Preferably, the disc rotator is a variable speed device.

Alternate RPM's may be used; preferences will vary, depending on the abrasive grit of the sanding pad and the amount of time the abrasive is applied to the disc. Attached to the end of the flat round disc 75 is a hook fabric 78 for the purpose of attaching loop fabric-type material 86 (e.g., synthetic hook and loop materials used for removable attachment purposes; e.g., Velcro®) used for removably attaching the polishing pads 42 and 52 and buffing pads 62 and 66 to disc 75. A foam pad with a linen backer 48 is illustrated as an example for the purpose of using a diamond abrasive, and is explained in detail below.

FIG. 5 is a perspective view illustrating the application of another embodiment of the polishing pad 42 with an attached polishing disc 44. Preferably, with reference to FIG. 6, polishing pad 42 is comprised of a dense foam 87 cut in a round cylindrical shape approximately 1 5/16 inches in diameter and ¼ inch in height. Preferably, one flat 1 5/16 inch diameter portion has a thin fabric cover 84 (e.g., hydro-entangled 1.6 oz. polyester/rayon blend fabric, see FIG. 6) permanently glued (with any permanent adhesive) to it, and the other flat 1 5/16 inch diameter portion has a loop fabric-type material 86 (e.g., synthetic hook and loop materials used for removable attachment purposes; e.g., Velcro®) permanently attached to the foam. The loop fabric 86 is used to removably attach the polishing pad 42 to the hook fabric 78 on the flat round disc 75 of the disc rotator 58 (embodying herein a set of polishing means removably attachable to such rotary spindle for polishing the operating surface; and a set of polishing pads each structured and arranged to be removably attached to such rotary spindle). In a preferred embodiment, polishing disc 44 is comprised of a 1 5/16 inch diameter disc, which is paper thin in thickness, and has a removable adhesive 96 on one side and an abrasive 93 approximately 15 microns thick on the other side. Covering the adhesive side 96 is a release sheet cover paper 92 (e.g., common to those knowledgeable in the art, such as 70 pound calendar stock). The release sheet cover paper 92 is removed, as illustrated in FIG. 5, and the adhesive side of the polishing disc 44 is applied with hand pressure to the underside 90 of the polishing pad 42 (i.e., the side without the loop fabric material 86).

FIG. 6 is a perspective view of a polishing pad 42 described above, without the polishing disc 44 attached. The description of FIG. 5 and FIG. 6 also applies to polishing pads 52 and 48.

FIG. 7 is a perspective view of a buffing pad 62. Buffing pad 62 is similar to buffing pad 66 and operates equally to buffing pad 66. Preferably, buffing pad 62 consists of a dense foam 94 cut in a round cylindrical shape approximately 1 5/16 inches in diameter and ¾ inch in height. Preferably, one flat 1 5/16 inch diameter portion has a loop fabric material 86 permanently attached to the foam. The other 1 5/16 inch diameter portion remains uncovered foam. The foam is used as a buffing surface for an abrasive that is applied to the surface of the foam and will be further described in detail below. The loop fabric 86 is used to removably attach the buffing pad 62 to the hook fabric 78 on the flat round disc 75 of the disc rotator 58 (embodying herein a buffing pad structured and arranged to be removably attached to such rotary spindle).

FIG. 8 is a perspective view of a polishing pad 42 and attached polishing disc 44 shown attached to a disc rotator 58. Preferably, the polishing pad 42 is attached to the disc rotator 58 utilizing the above described hook fabric 78 and loop fabric 86 attachment. As illustrated, the polishing pad 42 is attached with the loop fabric 86 connected to the hook fabric 78 on the flat round disc 75 of the disc rotator 58 in a relatively upward position, and the abrasive side, in a relatively downward position. (The buffing pad 62 attaches in a similar manner).

FIGS. 9 through 15 illustrate a preferred embodiment of the method of use/operation of the preferred disc repair kit system. Digitally recorded discs, known commonly as CD discs or DVD discs, may contain audio or video information. The digital information is currently interpolated or read by an optical reader that uses one or more laser beams or other light amplified beams to read the digital information; and such optical reading ability is the only intended limitation in using herein a specific term or embodiment like "CD disc". The current state of the art of manufacture of these CD discs is such that they are comprised of a round disc composed of a synthetic material (e.g., plastic), with a diameter of approximately 4¾ inches and an approximate thickness of 1/16 inches. The disc has a center aperture approximately 5/8 inches in diameter for receiving a centering spindle in a playback apparatus. Digitally recorded material extends on one side of the disc from about ¾ inches from the center aperture outward to within about ¼ inch of the peripheral end of the disc. A bearing area extends on the other side, in approximately the same dimensions, for bearing on the playback apparatus which spins the disc. The operation of the disc reader and playback apparatus is well-known by those skilled in the art and will not be further explained.

The side of the disc with digital data information is now further discussed. The digital information is contained on a relatively thin layer of metallic material covered by a protective layer of synthetic material, usually a plastic. A laser within the playback apparatus reads the digital information through the plastic layer 27. If the plastic layer 27 becomes scratched or stained, the laser cannot accurately read the digital information. The present embodiment of the disc repair system, a consumer kit, is provided for the purpose of solving the above-described problem.

Referring again to FIGS. 9 through 15, use of the disc repair system kit 10 reconditions the plastic covering such that the laser can optically read the digital information on the disc 30 and play it back with a playback apparatus. In operation, as shown in FIG. 10, the disc repair system kit 10 user places the scratched disc 30 onto the rubber disc holder 34 with the digital data side (that is scratched) facing upwardly (embodying herein placing the optically-read disc in a stationary position on a portable holder provided by the consumer kit, with the scratched operating surface facing upwardly). The disc 30 is placed such that the center spindle 32 fits into the center aperture of the disc 30. A polishing pad 42 with an attached polishing disc 44 assembly is placed onto the flat round disc 75 of the disc rotator 58 as shown in FIG. 9. Preferably, polishing disk 44 is a 15 micron grit abrasive surface. The disc rotator 58 is turned such that the surface of the polishing disc 44 is facing upwardly. Preferably, one or more drops of polishing compound 100 are applied to the polishing disc 44. The disc rotator 58 is then turned such that the surface of the polishing disc 44 is over the area of the disc 30 which is scratched and to be repaired, as shown in FIG. 10. For purposes of identifying the scratched area to be repaired, the rubber disc holder 34 has four quadrant marks 31, which are placed perpendicular to each other through the center of the disc. These marks, as shown, divide the rubber disc holder 34 into four quadrants. These quadrants are illustrated in FIG. 10 as quadrant 101, quadrant 102, quadrant 103 and quadrant 104. Preferably, as disc rotator 58 is turned over such that the surface of the polishing disc 44 comes into contact with the disc 30, the disc rotator 58 is turned on.

Preferably, the disc rotator 58 rotates the polishing disc 44 at approximately 600–1200 revolutions per minute (RPM's). The disc rotator 58 is moved back and forth over the scratched area, preferably covering the entire quadrant area that encompasses the scratch. For example, FIG. 11 illustrates a scratch that is being repaired in the area of quadrant 102 and quadrant 103. It is important that there be enough polishing compound 100 used to adequately cover the area being repaired. It may be necessary to repeat the step illustrated in FIG. 9 and FIG. 10 and add more polishing compound 100. The polishing disc 44 should be kept wet during the polishing process. Typically and preferably, the initial polishing process lasts about one minute. The initial polishing process illustrated in FIGS. 9–11 is used to remove a portion of the thin plastic layer 27 covering the digital data, thereby also removing the scratch(es).

The second polishing process is as described with respect to FIGS. 9–10, but occurs with polishing pad 52 and polishing discs 54. Preferably, polishing disc 54 is a 9 micron grit abrasive surface. As described in the first polishing process, the polishing pad 52 with an attached polishing disc 54 assembly is placed onto the flat round disc 75 of the disc rotator 58. The disc rotator 58 is turned such that the surface of the polishing disc 54 is facing upwardly. Preferably, one or more drops of polishing compound 100 are applied to the polishing disc 54. The disc rotator 58 is then turned such that the surface of the polishing disc 54 is over the area of the disc 30 which is scratched and to be repaired. Once again, as the disc rotator 58 is turned over such that the surface of the polishing disc 54 comes into contact with the disc 30, the disc rotator 58 is turned on. Preferably, the disc rotator 58 rotates the polishing disc 54 at approximately 600–1200 revolutions per minute (RPM's). The disc rotator 58 is moved back and forth over the scratched area, preferably covering the entire quadrant area that encompasses the scratch (this arrangement embodying herein using a hand-held rotating power tool having a rotary spindle, provided by such consumer kit, rubbing in a polishing order a selection of such abrasion products on such scratched operating surface). Preferably, the second polishing process lasts about one minute. Similar to the initial polishing, it may be necessary to add more polishing compound 100 as the polishing disc 44 should be kept wet during the polishing process. Since the abrasive grit of the polishing disc 54 is less abrasive than polishing disc 44, the plastic layer 27 will continue to be smoothed. Preferably, this smoothing process allows the laser to read the digital data as described previously.

The next step in the scratched disc repairing process is buffing. As illustrated in FIGS. 12–14, the buffing process is quite similar to the polishing process. Preferably, a buffing pad 62 (or buffing pad 66, being equal) is placed onto the flat round disc 75 of the disc rotator 58 using the hook 78 and loop fabric 86 attachment. As illustrated in FIG. 12, several drops of buffing compound 109 are placed onto the buffing pad 62. The disc rotator 58 is then turned over such that the surface of the buffing pad 62 is in the quadrant over the area of the disc 30 which is scratched and has been polished. As stated, preferably, as shown in FIG. 13, the disc rotator 58 is then turned over such that the surface of the buffing pad 62 comes into contact with the disc 30, and the disc rotator 58 is turned on. Preferably, the disc rotator 58 rotates the buffing pad 62 at approximately 6–800 revolutions per minute (RPM's). The disc rotator 58 is moved back and forth over the scratched area, as shown in FIG. 13, preferably covering the entire quadrant area(s) that encompasses the scratch (e.g., quadrants 102 and 103, as illustrated in FIG. 14). The buffing process is preferably accomplished similarly to the initial polishing process wherein it may be necessary to add more buffing compound 109 as the buffing pad 62 should be kept moist during the buffing process. Since the abrasive grit of the buffing compound 109 in combination with the buffing pad 62 is less abrasive than polishing disc 54, the plastic layer 27 will continue to be smoothed. The buffing compound 109 is preferably applied until the disc appears shiny. The buffing compound 109 is a light abrasive and may also be applied to the entire disc to remove small scratches that would not necessitate the use of the heavier abrasive in the polishing compound 100.

Figure 15:
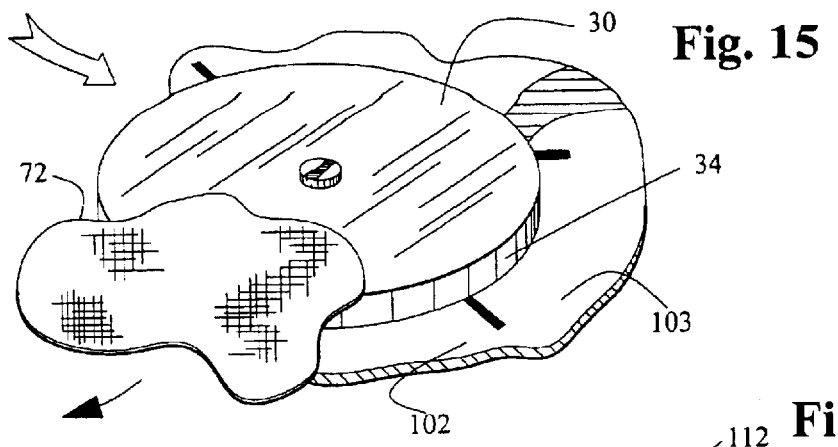
FIG. 15 is a perspective view illustrating the application of the final wiping cloth upon the compact disc.

Upon completing the buffing step, the user removes a disc wiping cloth 72 from the disc-wipe package 70. The disc wiping cloth 72 is used to remove the buffing compound 109 and swirl marks as shown in FIG. 15 (this arrangement embodying herein cleaning means for cleaning the operating surface; and a set of wipes each structured and arranged to clean the operating surface; and also a cleaning disc having a lesser grit than the polishing compound). In addition, disc wiping cloth 72 is used in conjunction with water or a disc-wiping solution comprised of a lightweight clear plastic polish (familiar to those skilled in the art) to lightly fill in any remaining buffing or swirl marks and add an additional coating of clear plastic polish to the plastic layer 27 of the disc 30 (embodying herein using cleaning elements provided by such consumer kit, cleaning such scratched operating surface), further enhancing the readability of the digital material through the plastic layer 27.

Figure 16:
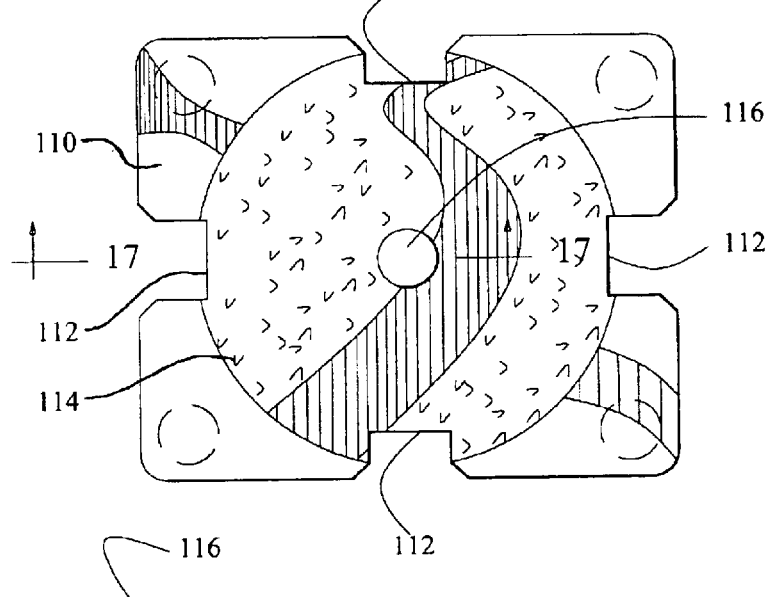
FIG. 16 is a perspective view illustrating another preferred embodiment of a compact disc holder.
Figure 17:
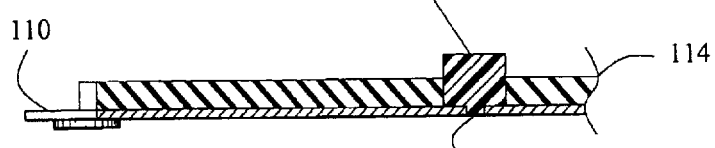
FIG. 17 is a cross-section view through the compact disc holder of section 16—16 of FIG. 16.

FIGS. 16 and 17 illustrate yet another embodiment of a rubber disc holder 110. Preferably, rubber disc holder 110 may be used on a work table top, or if the rubber disc holder 34 (see FIG. 2) is not used. Rubber disc holder 110 is preferably comprised of metal (but may be comprised of other suitable materials, such as plastic), and it performs a similar function to rubber disc holder 34. Instead of four quadrant marks 31, which are placed perpendicular to each other through the center of the disc, rubber disc holder 110 preferably has four u-shaped notches 112 placed perpendicular to each other. The unshaped notches 112 divide the rubber disc holder 110 into four equal quadrants and assist the user in identifying the scratched area to be repaired. Preferably, rubber disc holder 110 is about 4¾ inches square with a rubber disk 114 about 4¾ inches in diameter centered in the square. Preferably, rubber disc holder 110 is sized such that it is the same size as a standard compact disc. Preferably, in the center of rubber disc holder 110 is a round spindle 116 approximately 9/16 of an inch in diameter which penetrates both the rubber disk 114 and the rubber disc holder 110. The spindle 116 has a smaller portion 118 which is inserted through a ¼ inch hole in the bottom of rubber disc holder 110. The smaller portion 118 is preferably about ¼ inch in diameter and is adhesively inserted in a same sized ¼ inch hole in the center of rubber disc holder 110. Both the spindle 118 and rubber disc 114 are preferably permanently adhered to the rubber disc holder 110. One preferred adhesive method is use of a double-sided adhesive tape; however, other suitable permanent adhesives would suffice.

Figure 18:
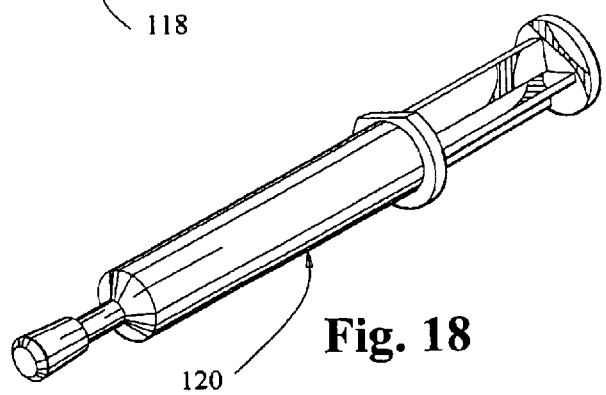
FIG. 18 is a perspective view of an alternate embodiment of an applicator for a diamond abrasive polishing compound.

FIG. 18 is a perspective view of an alternate embodiment of an applicator 120 for diamond abrasives. In this embodiment, a series of varying grit diamond abrasive compounds are used to remove scratches. For abrasives such as diatomaceous earth, alumina oxides and silica oxides variance and inconsistencies in grit particle size typically result from the manufacturing processes and from properties inherent to the material composition. Further, such grit particles wear down and break into smaller pieces over time. Preferably, diamond grit particles are synthetically manufactured, which allow for highly consistent grit particle sizes that more effectively abrade discs for optical reading. In operation, this embodiment is for an upgraded disc repair system kit 10 preferably structured by adding all described elements needed for abrading with diamond grit. Preferably, the diamond abrasives are a series of varying grit diamond abrasive compounds which are used to remove the scratches on the discs in lieu of and/or in addition to the above-described polishing and buffing compounds and discs. The diamond abrasive kit will be similar to the above-described embodiment of the disc repair system kit 10 with the differences as described below.

Preferably, for deep scratches, diamond abrasive (e.g., those available from Engis Corp., 105 W. Hintz Rd., Wheeling, Ill. 60090) is provided in the kit at the following grits: 60 microns, 30 microns, 15 microns and 6 microns (embodying herein wherein such set of abrasive products further comprises a series of diamond grit abrasives ranging from about 60 micron diamond grit to about 6 micron diamond grit). The diamond abrasive is used on the designated pad, which is a foam pad with a linen backer 48 (e.g., medium density closed cell foam, such as that available from Foamex, 4011 West Clarendon, Phoenix, Ariz. 85019, with attached 40 pound fabric linen available from a fabric store, such as H&R Sales, 1118 N 35$^{th}$ Avenue, Phoenix, Ariz. 85009). Preferably, at least four of the foam pads with a linen backer 48 would be put in the deluxe disc repair system kit 10 in addition to the polishing pads 52 and polishing discs 44. Preferably, each of the diamond abrasives is applied on a separate and clean foam pad with a linen backer 48 for a period of about two minutes on each application. Preferably, each of the diamond abrasives is colored in a different color, so as to be distinguished from one another. Preferably, the disc repair system kit 10 user places the scratched disc 30 onto the rubber disc holder 34 with the digital data side that is scratched facing upwardly. Then the preferred steps may be followed with help of FIGS. 9–15. The disc 30 is placed such that the center spindle 32 fits into the center aperture of the disc 30. A foam pad with a linen backer 48 is placed onto the flat round disc 75 of the disc rotator 58. The disc rotator 58 is turned over such that the surface of the foam pad with a linen backer 48 is facing upwardly. Preferably, one or more drops of 60 micron abrasive is applied to the surface of the foam pad with a linen backer 48. The disc rotator 58 is then turned such that the surface of the foam pad with a linen backer 48 is over the area of the disc 30 which is scratched and to be repaired. As stated previously, for purposes of identifying the scratched area to be repaired, the rubber disc holder 34 has four quadrant marks 31 which are placed perpendicular to each other through the center of the disc. These marks divide the rubber disc holder 34 into four quadrants. These quadrants are illustrated in FIG. 10 as quadrant 101, quadrant 102, quadrant 103 and quadrant 104. Preferably, as disc rotator 58 is turned over such that the surface of the foam pad with a linen backer 48 and 60 micron diamond adhesive comes into contact with the disc 30, the disc rotator 58 is turned on.

Preferably, the disc rotator 58 rotates the foam pad with a linen backer 48 at approximately 600–1200 revolutions per minute (RPM's). The disc rotator 58 is moved back and forth over the scratched area; preferably, covering the entire quadrant area that encompasses the scratch. For example, FIG. 11 illustrates a scratch that is being repaired in the area of quadrant 102 and quadrant 103. It is important that there be enough 60 micron diamond abrasive to adequately cover the area being repaired. It may be necessary to repeat the step illustrated in FIG. 9 and add more 60 micron diamond abrasive. Pad 48 should be kept wet with diamond abrasive during the entire polishing process. Preferably, the initial polishing process lasts about two minutes. The initial diamond abrasive polishing process is similar to that illustrated in FIGS. 9–11 with the exception of the use of the diamond abrasive in lieu of the polishing compound and polishing discs. Preferably, the initial polishing process is used to remove a portion of the thin plastic layer 27 covering the digital data, thereby also removing the scratch(es).

The second polishing process occurs with a 30 micron diamond abrasive and a second foam pad with a linen backer 48. As described in the first polishing process, a foam pad with a linen backer 48 is placed onto the flat round disc 75 of the disc rotator 58. The disc rotator 58 is turned over such that the surface of the foam pad with a linen backer 48 is facing upwardly. Preferably, one or more drops of 30 micron abrasive is applied to the surface of the foam pad with a linen backer 48. The disc rotator 58 is then turned such that the surface of the foam pad with a linen backer 48 is over the area of the disc 30 which is scratched and to be repaired. Preferably, the disc rotator 58 rotates the polishing disc 54 at approximately 600–1200 revolutions per minute (RPM's). The disc rotator 58 is moved back and forth over the scratched area; preferably, covering the entire quadrant area that encompasses the scratch. Preferably, the second polishing process lasts about two minutes. Similar to the initial polishing, it may be necessary to add more 30 micron abrasive polishing compound as the backer 48 should be kept wet during the polishing process. Since the abrasive grit of the 30 micron abrasive is less abrasive than the 60 micron abrasive, the plastic layer 27 will continue to be smoothed. Preferably, this smoothing process eventually allows the laser to read the digital data, as described previously.

Preferably, the above steps are repeated two more times using 15 micron diamond abrasive and 9 micron diamond abrasive. Since the abrasive grit of the abrasives continues to be less and less abrasive, the plastic layer 27 will continue to be smoothed.

Upon completing the abrasive polishing step, the next step in the scratched disc repairing process is buffing. As discussed previously and illustrated in FIGS. 12–14, the buffing process is as follows: Preferably, a buffing pad 62 (or buffing pad 66, being equal) is placed onto the flat round disc 75 of the disc rotator 58 using the hook 78 and loop fabric 86 attachment. As illustrated in FIG. 12, several drops of buffing compound 109 are placed onto the buffing pad 62. The disc rotator 58 is then turned such that the surface of the buffing pad 62 is in the quadrant over the area of the disc 30 which is scratched and has been polished. Preferably, the disc rotator 58 is then turned over such that the surface of the buffing pad 62 comes into contact with the disc 30, and the disc rotator 58 is turned on. Preferably, the disc rotator 58 rotates the buffing pad 62 at approximately 6–800 revolutions per minute (RPM's). The disc rotator 58 is moved back and forth over the scratched area; preferably, covering the entire quadrant area that encompasses the scratch (e.g., quadrant 102 and 103 as illustrated in FIG. 14). The buffing process is preferably accomplished similarly to the initial polishing process wherein it may be necessary to add more buffing compound 109 as the buffing pad 62 should be kept moist during the buffing process. Since the abrasive grit of the buffing compound 109 in combination with the buffing pad 62 is less abrasive than the polishing grits, the plastic layer 27 will continue to be smoothed. The buffing compound 109 is preferably applied until the disc appears shiny. The buffing compound 109 is a light abrasive and may also be applied to the entire disc to remove small scratches that would not necessitate the use of the heavier abrasive in the polishing compound 100.

Upon completing the buffing process, the user removes a disc wiping cloth 72 from the disc-wipe package 70. The disc wiping cloth 72 is used to remove the remaining 9 micron abrasive and any left-over swirl marks (as shown in FIG. 15).

In addition, disc wiping cloth 72 is used in conjunction with a disc-wiping solution comprised of a lightweight clear plastic polish, which is a mixture of distilled water, silicone additive, and alcohol (familiar to those skilled in the art) to lightly fill in any remaining buffing or swirl marks and add an additional coating of clear plastic polish (silicone) to the plastic layer 27 of the disc 30, further enhancing the readability of the digital material through the plastic layer 27.

Although applicant has described applicant's preferred embodiments of this invention, it will be understood that the broadest scope of this invention includes such modifications as diverse shapes, sizes and materials. Such scope is limited only by the below claims as read in connection with the above specification. Further, many other advantages of applicant's invention will be apparent to those skilled in the art from the above descriptions and the below claims.

What is claimed is:

1. A consumer kit for reconditioning a scratched operating surface of at least one optically-read disc, comprising, in combination:
    a) at least one optically-read-disc holder adapted to hold the at least one optically-read disc in a substantially stationary position with the optically-read surface exposed and facing upwardly;
    b) at least one abrasive product adapted to abrade the operating surface when rotatably rubbed on the operating surface; and
    c) at least one hand-held rotary power tool comprising
        i) a powered rotary spindle structured and arranged to removably hold the at least one abrasive product; and
    d) wherein said at least one abrasive product comprises diamond grit abrasive.

2. The consumer kit according to claim 1 wherein said at least one abrasive product comprises diamond grit abrasive ranging from about 60 micron diamond grit to about 6 micron diamond grit.

3. A system for reconditioning at least one scratched operating surface of at least one optically-read disc, comprising, in combination:
    a) at least one holding means for holding the at least one optically-read disc;
    b) at least one abrasive means for abrading the at least one scratched operating surface of the at least one optically-read disc;
    c) wherein said at least one abrasive means comprises at least one diamond abrasive of at least one grit size.

4. A system for reconditioning at least one scratched operating surface of at least one optically-read disc, comprising, in combination:
    a) at least one holder structured and arranged to hold the at least one optically-read disc;
    b) at least one abrader structured and arranged to abrade the at least one scratched operating surface of the at least one optically-read disc;
    c) wherein said at least one abrader comprises at least one diamond abrasive of at least one grit size.

5. A system for reconditioning at least one scratched operating surface of at least one optically-read disc, comprising in combination:
    a) an optically-read-disc holder structured and arranged to hold the at least one optically-read disc in a desired position;
    b) a set of diamond abrasive products structured and arranged to abrade the at least one scratched operating surface when rubbed on the at least one scratched operating surface.

6. The system according to claim 5, wherein said set of diamond abrasive products comprises abrasive particles at least 6 microns in size.

7. The system according to claim 5, wherein said set of diamond abrasive products comprises a progressively finer abrasive particle series in a range between about 60 microns to about 6 microns.

8. The system according to claim 5, wherein said set of diamond abrasive products further comprises:
   a) 60 micron diamond grit;
   b) 30 micron diamond grit;
   c) 15 micron diamond grit; and
   d) 6 micron diamond grit.

9. A method for reconditioning at least one scratched operating surface of at least one optically-read disc, comprising, in combination, the steps of:
   a) placing the at least one optically-read disc on the at least one holding means, with the scratched operating surface exposed;
   b) providing a set of diamond abrasive products structured and arranged to remove material from said scratched operating surface when rubbed on said scratched operating surface.

10. The method according to claim 9, wherein said set of diamond abrasive products comprises abrasive particles at least 6 microns in size.

11. The method according to claim 9, wherein said set of diamond abrasive products comprises a progressively finer abrasive particle series in a range between about 60 microns to about 6 microns.

12. The method according to claim 9, wherein said set of diamond abrasive products further comprises:
   a) 60 micron diamond grit;
   b) 30 micron diamond grit;
   c) 15 micron diamond grit; and
   d) 6 micron diamond grit.

* * * * *